Patented Jan. 2, 1923.

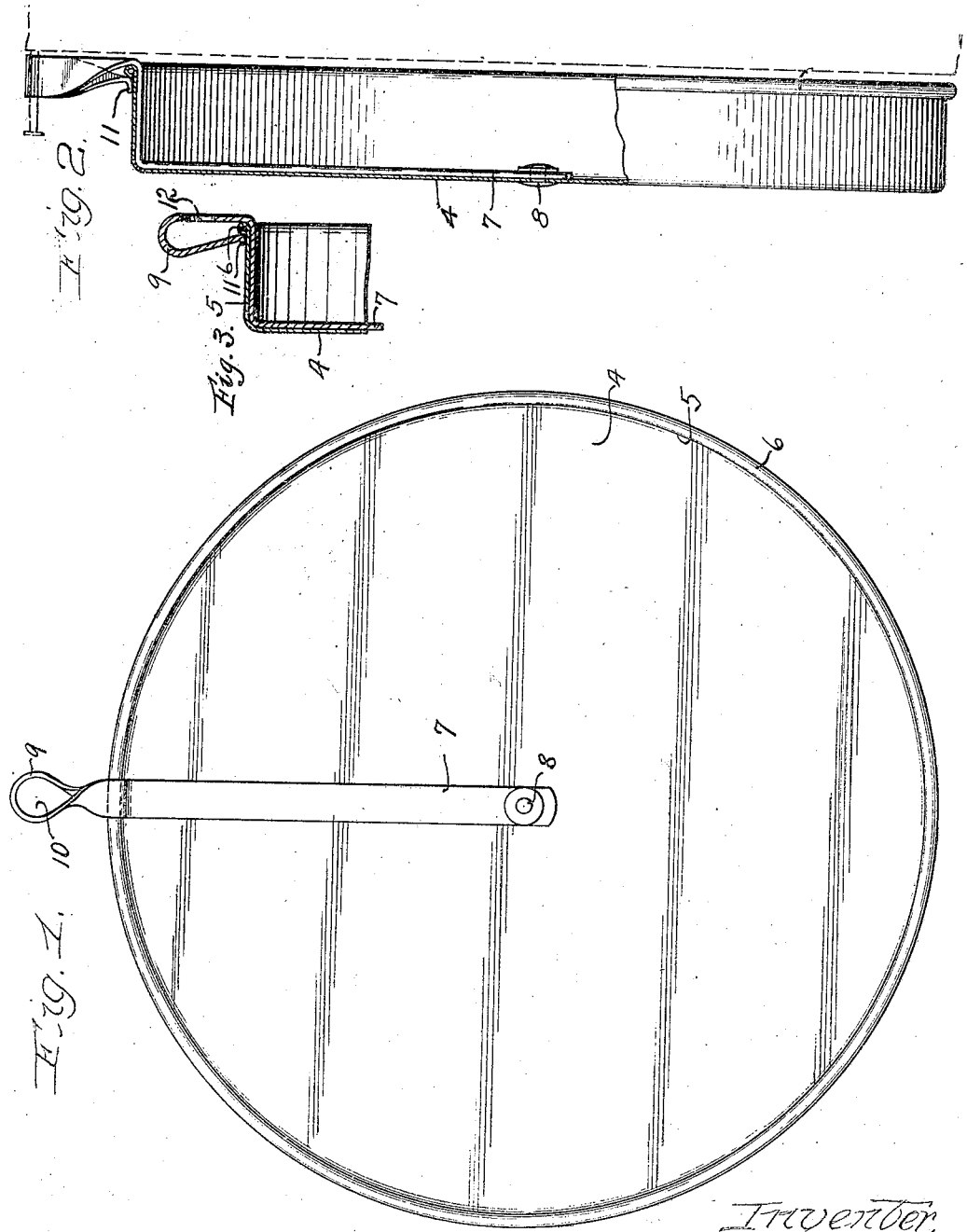

1,440,543

UNITED STATES PATENT OFFICE.

ARTHUR KATZINGER, OF CHICAGO, ILLINOIS, ASSIGNOR TO EDWARD KATZINGER COMPANY, OF CHICAGO, ILLINOIS, A CORPORATION OF ILLINOIS.

BAKING PAN.

Application filed April 2, 1921. Serial No. 457,894.

*To all whom it may concern:*

Be it known that I, ARTHUR KATZINGER, a citizen of the United States, residing at Chicago, in the county of Cook and State of Illinois, have invented certain new and useful Improvements in Baking Pans, of which the following is a specification.

My invention relates to baking pans and has for one of its objects the provision of a simple and efficient device of this character having means for quickly and easily removing articles baked therein.

A further object is the provision of a baking pan having a knife movably associated therewith and said knife provided with an opening adapted to engage an article for supporting the pan when not in use.

Other objects will appear hereinafter.

An embodiment of my invention is shown in the accompanying drawing, forming a part of this specification, and in which—

Fig. 1 is a top view of a baking pan equipped with my invention;

Fig. 2 is a view partially in section and partially in side elevation of my improved pan; and Fig. 3 is a fragmental section showing a slightly different form of supporting means for the pan.

Referring more particularly to the drawing, I have indicated a baking pan of circular form having a plane bottom 4 with a substantially cylindrical side wall 5, and at the top of the side wall is a wired rim 6. These parts may be any of the well-known constructions now in general use.

Pivotally secured to the pan bottom at the center thereof is a knife 7. The knife 7 may be pivotally connected by a rivet 8, or any other means, so that the knife 7 may pass around on the inside of the bottom and side walls to loosen a cake or other article baked in the pan.

At one end of the knife 7 is a portion extending over the wired rim 6 and disposed in a loop 9. The loop 9 is preferably twisted, as clearly indicated in Figs. 1 and 2, so as to provide an opening 10 which may be passed over a nail in a wall for supporting the pan when not in use. An end portion 11 of the knife member engages the under edge of the rim 6 so as to support the knife and hold the latter in position for freely moving around the pan relatively thereto and still be maintained in operative condition.

In Fig. 3 I have indicated the portion of the knife which extends beyond the pan edge as not having the twist in it and provided with an opening 12 in one side of the loop 9 in a manner to let the opening 12 pass over the head of a nail for supporting the pan when not in use.

Obviously those skilled in the art may make various changes in the details and arrangements of parts without departing from the spirit and scope of my invention as defined by the claims hereto appended and I wish therefore not to be restricted to the precise construction herein disclosed.

I claim:—

1. In combination, a circular baking pan having an upstanding peripheral wall with a wired rim at the top of said wall, and a knife pivoted at the center of the pan with a portion extending beyond the periphery thereof and engaging said wired rim, said portion being disposed in a twist with a loop therein opening in the direction of the open side of said pan.

2. In combination, a baking pan, and a knife movably associated with the pan, said knife having a portion extending over the edge of said pan and disposed in a twist and loop, said loop being adapted for supporting the pan when not in use.

3. The combination with a circular baking pan, of a radial knife pivoted to the center of said pan, and an integral extension of said knife and of twisted loop formation to serve as a handle and also as means by which to suspend the pan when not in use.

4. The combination with a circular baking pan, of a radial knife pivoted to the center thereof, and a twisted loop handle for said knife and extending to the lower outside edge of the rim of the pan to hold the knife at the bottom of the pan while said knife is swung on its pivot by means of said handle, the loop in said handle being adapted to suspend the pan when not in use.

5. The combination with a circular pan having an outwardly extending rim, of an elongated strip having one end pivoted at the axis of said pan, an intermediate portion disposed flat against the bottom of the pan, another portion disposed tightly against the inside of the upstanding wall of said pan, another portion disposed in a loop and twisted with the opening of the loop opening in a general direction of the open side of the pan, another portion engaging the under side of the pan rim, and its other end engaging the outer side of the upstanding pan wall.

In testimony whereof I have signed my name to this specification on this 31st day of March A. D. 1921.

ARTHUR KATZINGER.